Figures 1, 2:
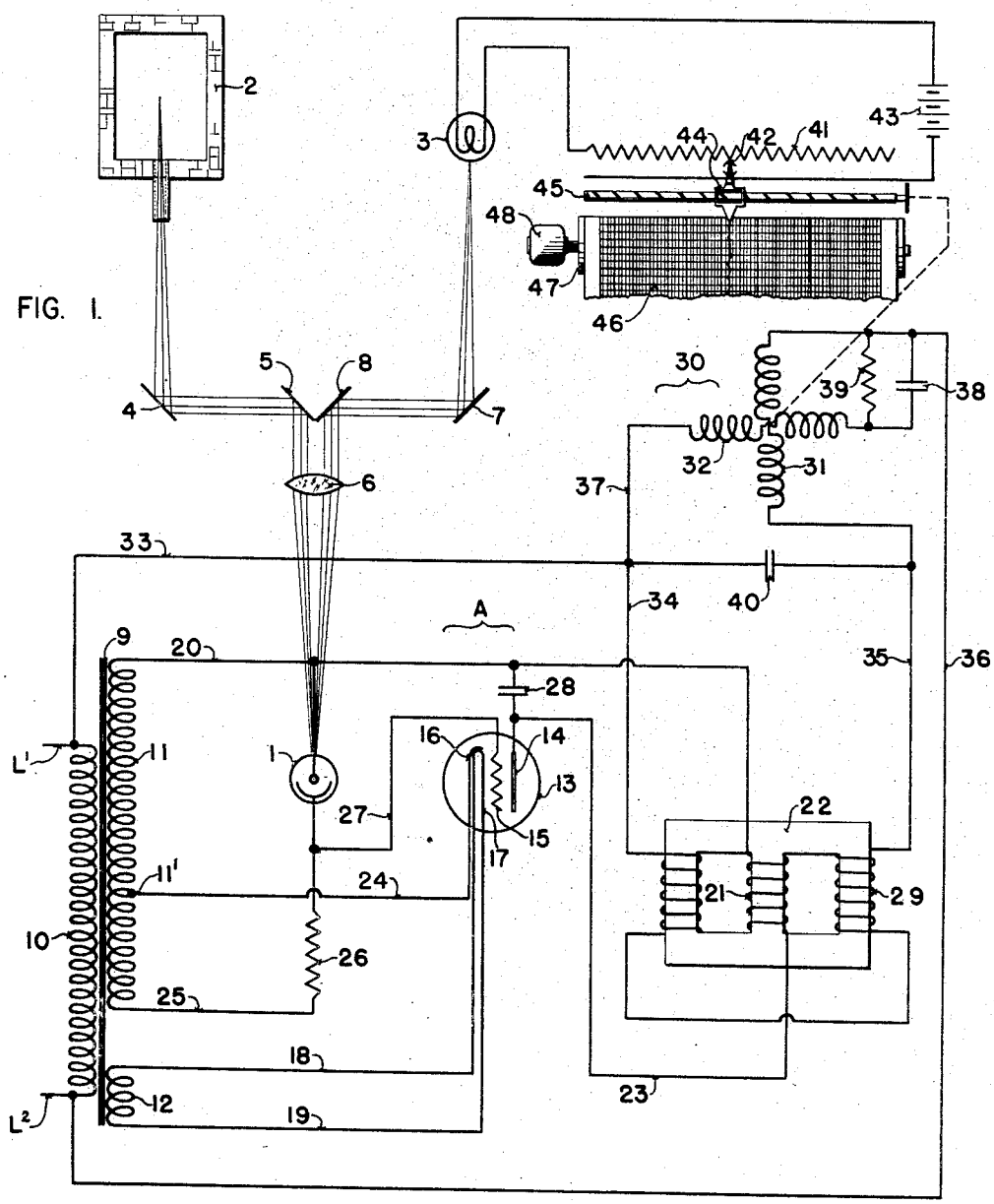

Oct. 29, 1940.                    T. R. HARRISON                    2,219,775
                                MEASURING APPARATUS
                                Filed Nov. 20, 1937

INVENTOR.
THOMAS R. HARRISON
BY George M. Murchanf
ATTORNEY.

Patented Oct. 29, 1940

2,219,775

UNITED STATES PATENT OFFICE 2,219,775

MEASURING APPARATUS

Thomas R. Harrison, Wyncote, Pa., assignor to The Brown Instrument Company, Philadelphia, Pa., a corporation of Pennsylvania Application November 20, 1937, Serial No. 175,738

17 Claims. (Cl. 88—22.5)

The present invention relates to apparatus for ascertaining and continuously recording and/or controlling the magnitude of a variable condition, and more particularly the invention relates to self balancing measuring apparatus which is of special utility in recording and/or controlling temperature variations in incandescent bodies.

An object of the invention is to provide radiant energy responsive apparatus for ascertaining and continuously recording and/or controlling temperature variations in incandescent bodies.

A further object of the invention is to provide apparatus of the type referred to above which is characterized by being extremely fast in response and self-balancing.

Another object of the invention is to provide high speed temperature measuring apparatus in which a light sensitive device may be employed as the condition responsive element, and in which delicate electrical ammeters or milliammeters are not required nor employed.

In measuring and recording temperature variations in incandescent bodies it is relatively important in certain applications that the apparatus employed be capable of responding to and recording the variations in a minimum of time. For example, if an accurate record is desired of the variations in temperature throughout their length of successive pieces of material such as bars or billets passing in process through a steel mill, it is of especial importance that the measuring apparatus be capable of a high speed of response. The practicability of employing light sensitive devices or photoelectric cells in making such measurements is readily apparent, since, as is well known, photoelectric cells are characterized by their extreme rapidity of response to variations in light intensity and pass an electric current which bears a definite relation to the temperature of the body from which the light emanates.

Various high speed radiant energy responsive systems utilizing a light sensitive device as the condition-responsive element have been heretofore been proposed for measuring and recording temperature variations in incandescent bodies, but have been of a deflectional type employing a delicate electrical current measuring instrument and a scale or chart with which the deflecting member or pointer of the instrument is adapted to cooperate. In the proposed systems the radiant light from an incandescent body is ordinarily directed on a photoelectric cell and the electric current passed by the cell is measured by a suitably calibrated electrical current measuring instrument. In some instances, the current passed by the photoelectric cell is first amplified by some form of electronic amplifier and the amplified quantity is measured by a similarly calibrated electrical current measuring instrument. As is apparent the position of the deflecting member or pointer of the instrument relative to the scale thereof will provide a measure of the temperature of the incandescent body, and, if a record is desired, suitable apparatus may be arranged in cooperative relation with the instrument pointer to periodically record its position on a chart or a pen may be mounted directly on the instrument pointer and arranged to cooperate with a chart to thereby provide a continuous record of the temperature variations. Since the only time lag in recording by the last mentioned method is that required for the instrument pointer to swing up scale, this method has proved to be the most desirable of the prior art devices adapted for utilizing to advantage the high speed of response of the light sensitive elements.

As is well known, however, deflectional measuring instruments are undesirable in many respects for making precision measurements. For example, the calibration of a deflectional measuring instrument is dependent upon the constancy of magnets, springs, jewel bearings, and the level of the instrument, all of which are affected and changed to varying extents by many factors such, for example, as temperature, age, and vibration. Such instruments, furthermore, are limited in respect to the available torque for recording or controlling purposes making necessary the use of narrow and therefore undesirable charts and unsatisfactory control instrumentalities. Such instruments, furthermore, embody charts having nonrectangular coordinates which are undesirable and ordinarily the periodicity of response necessarily employed results in sluggish response thereof to small departures.

The above objections have been avoided in the apparatus of my invention by providing a self balancing network adapted to be employed in conjunction with the radiant energy responsive means for recording the measured variations in a minimum of time. In accordance with my invention, light emanating from an incandescent body whose temperature is to be measured is focussed on a photoelectric cell together with light from an adjustable source such as an electric lamp, and the photoelectric cell is employed to influence the operation of suitable apparatus for varying the intensity of illumination of the incandescent lamp, upon variation in the illumination from the incandescent body, so as to maintain the illumination of the photoelectric cell constant at a predetermined value.

In the preferred embodiment of my invention, the apparatus referred to for changing the illumination of the incandescent lamp includes an adjustable current limiting resistor connected in series with the lamp energizing terminals and its energizing source. The amount of the current limiting resistor in circuit is adapted to be varied by a reversible electrical motor which is selectively energized for operation in one direction or the other under control of the photoelectric cell. Thus, as the temperature of the incandescent body varies causing a change in the illumination of the photoelectric cell, the motor will be energized for rotation in a corresponding direction and will effect an adjustment of the movable contact of the current limiting resistor in the proper direction to change the illumination of the incandescent lamp as required to restore the illumination on the photoelectric cell to the predetermined normal value. As will be clearly apparent, the supply of energizing current to the incandescent lamp and thereby the position of the movable contact along the current limiting resistor, will then provide a measure of the temperature of the incandescent body, and, if desired, a pen may be mounted on the carrier of the movable contact and arranged to cooperate with a suitably calibrated record chart for recording the temperature variations.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Of the drawing:

Fig. 1 is a diagrammatic view illustrating one embodiment of the invention as adapted for use in measuring and recording the temperature of an incandescent body; and Fig. 2 is a diagrammatic view illustrating the use of my invention in a control system.

In Fig. 1 of the drawing a photopyrometer is illustrated in which a photoelectric cell 1 is arranged to receive light jointly from the interior of a furnace 2 and from a lamp 3, the illumination of which is adapted to be controlled by means responsive to the illumination of the photoelectric cell 1. The photoelectric cell 1 is connected to the input circuit of an electronic amplifier A, and as the temperature of the incandescent material within the furnace varies, the output current from the amplifier operates through suitable apparatus to be described to vary the supply of energizing current to lamp 3 as required to restore the illumination on the photoelectric cell to its former value. As will be clearly apparent, the magnitude of the lamp energizing current will then be a measure of the temperature of the incandescent material in the furnace 2.

As illustrated, light from the furnace 2 is directed onto the photoelectric cell 1 by means of mirrors 4 and 5 and a converging lens 6, and light from the lamp 3 is directed onto the photoelectric cell by means of mirrors 7 and 8 and lens 6. The photoelectric cell 1 is arranged in a suitable casing, not shown, and the casing is so arranged that the only light which impinges on the cell is that from the furnace 2 and lamp 3.

As noted hereinbefore the current conducted by the photoelectric cell 1 is adapted to be amplified by the amplifier A which, as illustrated includes a transformer 9 and an electronic valve 13. The transformer 9 is a combination step-up and step-down transformer and includes a primary winding 10 which is energized from alternating voltage supply conductors $L^1$ and $L^2$, a high voltage secondary winding 11 having a tap $11^1$ disposed near the lower end as seen in Fig. 1, and a low voltage secondary winding 12. The valve 13 is a heater type triode and includes an anode 14, a control grid 15, a cathode 16, and a heater filament 17, the latter of which is connected by conductors 18 and 19 to the terminals of the low voltage transformer secondary winding 12 and receives energizing current therefrom.

Anode voltage is supplied valve 13 from a portion of the high voltage transformer secondary winding 11 through a circuit which may be traced from the upper end of the winding to conductor 20, the direct current winding 21 of a saturable reactor 22, conductor 23, anode 14, cathode 16, and conductor 24 to the tap $11^1$ on the winding. Energizing voltage is supplied the photoelectric cell 1 from the transformer secondary winding 11 also, and this energizing circuit may be traced from the upper end of winding 11 to conductor 20, the anode of photoelectric cell 1, the cathode of the latter, and conductor 25 in which a resistor 26 is inserted to the lower end of winding 11.

The cathode of photoelectric cell 1 is connected by a conductor 27 to the control grid 15 of valve 13 and as will be noted the anode of cell 1 is connected to the anode 14 of valve 13 through the direct current winding 21 of the saturable reactor 22. Thus, the photoelectric cell 1 and valve 13 will both be conductive during the same half cycles of the alternating voltage induced in the transformer secondary winding 11, and as will be clear, the photoelectric cell will be operative to control the conductivity of valve 13 in accordance with the value of the light impinging thereon.

Bias voltage is supplied the control grid 15 of valve 13 by the portion of the transformer secondary winding 11 between the tap $11^1$ and the lower end of the winding, and in operation the value of this bias voltage is so adjusted that when the illumination on the photoelectric cell is a predetermined value, the pulsating current conducted by the valve 13 will be a desirable value. This pulsating current is passed through the direct current winding 21 of the saturable reactor 22, and in order to smooth out the pulsations a condenser 28 is connected across the terminals of the winding 21.

The saturable reactor 22 also includes an alternating current winding 29 in addition to the direct current winding 21, both of which are wound on a magnetic core, the saturation of which is controlled in accordance with the current flow through the direct current winding 21. When the direct current winding is deenergized the alternating current winding 29 presents a relatively high impedance to the flow of current therethrough, but as the current flow through the direct current winding 21 is increased, the magnetic saturation of the core is increased, and due to this action, the impedance of the alternating current winding 29 is decreased to a corresponding extent.

The alternating current winding 29 is connected in a circuit including the alternating voltage supply conductors L¹ and L² and one phase winding 31 of a two-phase reversible motor 30 which, as shown, also includes a phase winding 32. This circuit may be traced from the supply conductor L¹, conductor 33, conductor 34, the alternating current winding 29 of reactor 22, conductor 35, motor winding 31, and conductor 36 to the supply conductor L². The motor phase winding 32 receives energizing current from the supply conductors L¹ and L² through a circuit which may be traced from the supply conductor L¹, conductor 33, conductor 37, motor winding 32, a condenser 38 which may be shunted by a resistor 39 and conductor 36 to the supply conductor L². As will be clear to those skilled in the art, condenser 38 and resistor 39 are employed to offset the inductive effect of the motor winding 32 whereby the alternating current flow through this winding will be substantially in phase with the alternating voltage supplied by conductors L¹ and L².

It will be noted a condenser 40 is connected in parallel with the alternating current winding 29 of reactor 22, and as will later be described, this condenser tends to give the current flowing through the motor winding 31 a leading characteristic relative to the alternating voltage supplied by conductors L¹ and L². As will be clear, the effect of the alternating current winding 29, when the impedance of the latter is a comparatively low value such as will be produced by relatively high saturation of the saturable reactor 22, is to give the current flowing through the motor winding 31 a lagging characteristic relative to the voltage of the supply conductors.

Thus, when the saturation of the reactor 22 is a certain predetermined value, the inductive effect of the alternating current winding 29 will just offset the capacitative effect of the condenser 40 so that the alternating current flowing through the motor winding 31 will be in phase with the alternating voltage of the supply conductors L¹ and L² and therefore, in phase with the current flow through the motor winding 32 whereby the motor will not be energized for rotation in either direction, but will remain stationary. If the saturation of the magnetic core is increased or decreased, however, causing the current flow through the motor winding 31 to lag or lead the current flow through the motor winding 32, the interaction of the magnetic fields set up by the windings will set up a rotating field in one direction or the other in the motor and cause rotation of the latter in a corresponding direction.

In accordance with the present invention the reversible electrical motor 30 is employed to control the supply of energizing current to the lamp 3 so that upon variation in the temperature of the incandescent material in the furnace 2 and a resultant change in the illumination of photoelectric cell 1, the motor 30 will be energized for rotation in a corresponding direction and operates to vary the supply of energizing current to lamp 3 as required to restore the illumination of photoelectric cell 1 to its previous value. As illustrated, the means for varying the supply of energizing current to lamp 3 includes a current limiting resistor 41 having a movable contact 42 adjustable relatively to the resistor for varying the amount of resistance in circuit. Resistor 41 is connected in series with the lamp energizing terminals and the lamp energizing source, illustrated as a battery 43. Contact 42, adapted to vary the amount of resistance 41 in circuit with the lamp 3, is attached to a suitable carrier 44 which is capable of being moved along the length of resistor 41. In attaining this end the carrier 44 may be mounted on a screw shaft 45 and arranged to be moved in one direction or the other as the shaft is rotated. The shaft 45 is connected in any convenient manner to the shaft of motor 30 so that when the motor is actuated for rotation in one direction or the other, the shaft 45 will be rotated in the desired direction to vary the position of contact 42 relatively to resistor 41 and thereby the supply of energizing current to lamp 3.

As will be clearly apparent, a pen may be mounted on carrier 44 and arranged in cooperative relation with a recorder chart 46 for recording the variations in temperature of the material in furnace 2. The recorder chart 46 is arranged to be driven by a continuously rotating roller 47 and the latter is driven in any convenient manner, as for example, by a unidirectional motor 48 through suitable gearing, not shown, so that a record of the temperature of the incandescent material in the furnace 2 will be had as a continuous line on the chart 46.

It will be apparent that motor 30 may be employed to operate a control valve or a rheostat for governing the application of an agent to a furnace for producing heat, for example, to the radiant energy of which the photoelectric cell 1 is responsive, or another motor desirably operated together with the motor 30 may be so employed. For example, as illustrated, more or less diagrammatically in Fig. 2, a furnace 2 to which the photoelectric cell 1 is responsive, is heated by a resistor 49 which is connected to electric supply conductors L³ and L⁴ through a rheostat 51, the adjustment of which is effected by a motor 50. The motor 50 may be exactly like the motor 30, and is shown in Fig. 2 as having its terminals connected to the conductors 35, 36, and 37 in parallel with the corresponding terminals of motor 30. The mechanical connection of the rheostat 51 to the motor 50 is such as to increase and decrease the supply of electric current to the resistor 49 as the temperature of the incandescent material in the furnace 2 drops below or rises above a predetermined level.

The saturable reactor motor control circuit disclosed in this application and not claimed herein is being claimed in my copending application Serial No. 178,898, filed December 9, 1937.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Photometric apparatus for measuring the illumination from an unknown source of light including the combination of a light sensitive device and an electronic amplifier having an input circuit and an output circuit, a known source of light, means for subjecting said light sensitive device simultaneously to unmodified light from said unknown source and from said known source, means including said light sensitive device associated with the input circuit of said amplifier operative upon a change in the illumination of said unknown source to vary the current in the output circuit of said amplifier, means to vary the illumination of said known source to maintain the total illumination of said light sensitive device at a predetermined constant value, and means responsive to the magnitude of the output current of said amplifier to render said varying means operative only when the total illumination of said light sensitive device is above or below said predetermined value.

2. Means for measuring the illumination from a source of light including an electric lamp constituting a second source of light, means for supplying energizing current to said lamp, a light sensitive device, means for subjecting said light sensitive device simultaneously to unmodified light from said first mentioned source and from said second mentioned source, means to control said lamp energizing means to maintain the total illumination of said light sensitive device at a predetermined constant value, means associated with said light sensitive device to render said last mentioned means operative only when the total illumination of said light sensitive device is above or below said predetermined value, and means for measuring said lamp energizing current.

3. Means for measuring the temperature of an incandescent body including means responsive to the energy radiating from said body, an electric lamp constituting a second source of radiant energy, means for supplying energizing current to said lamp, means for subjecting said responsive means simultaneously to unmodified radiant energy from said first mentioned source and from said second mentioned source, means to control said lamp energizing means to maintain the total radiant energy impinging on said responsive means at a predetermined constant value, means associated with said responsive means to render said last mentioned means operative only when the total radiant energy impinging on said responsive means is above or below said predetermined value, and means for measuring said lamp energizing current.

4. Means for measuring the illumination from a source of light including an electric lamp constituting a second source of light, means for supplying energizing current to said lamp, a light sensitive device, means for subjecting said device simultaneously to unmodified light from said first mentioned source and from said second mentioned source, means to control said lamp energizing means to maintain the total illumination of said device at a predetermined constant value, a reversible electrical motor to control said controlling means, means associated with said light sensitive device to selectively render said reversible electrical motor operative for rotation in one direction or the other only when the total illumination of said light sensitive device is above or below said predetermined value, and means for measuring said lamp energizing current.

5. Means for measuring the illumination from a source of light including an electric lamp constituting a second source of light, an adjustable impedance, means for supplying energizing current to said lamp through said adjustable impedance, a light sensitive device, means for subjecting said light sensitive device simultaneously to unmodified light from said first mentioned source and from said second mentioned source, a device to control said adjustable impedance, means to control the actuation of said device to maintain the total illumination of said light sensitive device at a predetermined constant value, and means under control of said light sensitive device to render said controlling means operative only when the total illumination of said light sensitive device is above or below said predetermined value.

6. Means for measuring the illumination from a source of light and including an electric lamp constituting a second source of light, means for supplying energizing current to said lamp, a light sensitive device, means for subjecting said light sensitive device simultaneously to unmodified light from said first mentioned source and from said second mentioned source, a device to control said second mentioned means to maintain the total illumination of said light sensitive device at a predetermined constant value, and physically stationary means under control of said light sensitive device to render said controlling device operative only when the total illumination of said light sensitive device is above or below said predetermined value.

7. Means for measuring the illumination from a source of light including an electric lamp constituting a second source of light, means for supplying energizing current to said lamp, an electronic amplifier having an input circuit and an output circuit, a light sensitive device connected in the input circuit of said amplifier, means for impinging unmodified light on said light sensitive device simultaneously from said first mentioned source and from said second mentioned source, a device to control said second mentioned means to maintain the total illumination of said light sensitive device at a predetermined constant value, and means disposed in the output circuit of said amplifier to render said controlling device operative only when the total illumination of said light sensitive device is above or below said predetermined value.

8. Means for measuring the illumination from a source of light including an electric lamp constituting a second source of light, means for supplying energizing current to said lamp, an electronic amplifier having an input circuit and an output circuit, a light sensitive device connected in the input circuit of said amplifier, means for impinging unmodified light on said light sensitive device simultaneously from said first mentioned source and from said second mentioned source, a reversible electrical motor to control said second mentioned means to maintain the total illumination of said light sensitive device at a predetermined constant value, and means disposed in the output circuit of said amplifier to render said reversible electrical motor operative for rotation in one direction or the other only when the total illumination of said light sensitive device is above or below said predetermined value.

9. Means for measuring the illumination from a source of light including an electric lamp constituting a second source of light, means for supplying energizing current to said lamp, an electronic amplifier having an input circuit and an output circuit, a light sensitive device connected in the input circuit of said amplifier, means for impinging unmodified light on said light sensitive device simultaneously from said first mentioned source and from said second mentioned source, a reversible electrical motor to control said second mentioned means to maintain the total illumination of said device at a predetermined constant value, and physically stationary means disposed in the output circuit of said amplifier and responsive to the magnitude of the current flow therein to render said reversible electrical motor operative for rotation in one direction or the other only when the total illumination of said light sensitive device is above or below said predetermined value.

10. Means for measuring the illumination from a source of light including an electric lamp constituting a second source of light, a source of energizing current for said lamp, an adjustable impedance in circuit with said lamp and said energizing source adapted to be varied to cause a change in the illumination of said lamp, a light sensitive device the conductivity of which is variable in accordance with the extent to which it is illuminated, means for subjecting said light sensitive device simultaneously to unmodified light from said first mentioned source and from said second mentioned source, a reversible electrical motor to vary said impedance to maintain the total illumination of said light sensitive device at a predetermined constant value, and means responsive to the magnitude of the conductivity of said light sensitive device to selectively render said reversible electrical motor operative for rotation in one direction or the other only when the total illumination of said light sensitive device is above or below said predetermined value.

11. Means for measuring the illumination from a source of light including an electric lamp constituting a second source of light, a source of energizing current for said lamp, a resistance in circuit with said lamp and said energizing source adapted to be varied to cause a change in the illumination of said lamp, a light sensitive device, means for subjecting said light sensitive device simultaneously to unmodified light from said first mentioned source and from said second mentioned source, a reversible electrical motor to vary said resistance to maintain the total illumination of said light sensitive device at a predetermined constant value, and means under control of said light sensitive device to selectively render said reversible motor operative for rotation in one direction or the other only when the total illumination of said light sensitive device is above or below said predetermined value.

12. Means for measuring the illumination from a source of light including an electric lamp constituting a second source of light, a source of energizing current for said lamp, a resistance in circuit with said lamp and said energizing source adapted to be varied to cause a change in the illumination of said lamp, a light sensitive device, means for subjecting said light sensitive device simultaneously to unmodified light from said first mentioned source and from said second mentioned source, a device to vary said resistance to maintain the total illumination of said light sensitive device at a predetermined constant value, and means under control of said light sensitive device to render said varying device operative only when the total illumination of said light sensitive device is above or below said predetermined value.

13. Means for measuring the illumination from a source of light including an electric lamp constituting a second source of light, a source of energizing current for said lamp, a resistance in circuit with said lamp and said energizing source adapted to be varied to cause a change in the illumination of said lamp, a light sensitive device, means for subjecting said light sensitive device simultaneously to unmodified light from said first mentioned source and from said second mentioned source, a reversible electrical motor to vary said resistance to maintain the total illumination of said light sensitive device at a predetermined constant value, means under control of said light sensitive device to selectively render said reversible electrical motor operative for rotation in one direction or the other only when the total illumination of said light sensitive device is above or below said predetermined value, and means for measuring the value of said resistance.

14. Means for measuring the illumination from a source of light including an electric lamp constituting a second source of light, a source of energizing current for said lamp, a resistance in circuit with said lamp and said energizing source adapted to be varied to cause a change in the illumination of said lamp, an electronic amplifier having an input circuit and an output circuit, a light sensitive device connected in the input circuit of said amplifier and adapted to control the flow of current in the output circuit thereof, means for impinging unmodified light on said light sensitive device simultaneously from said first mentioned source and from said second mentioned source, a reversible electrical motor to vary said resistance to maintain the total illumination of said light sensitive device at a predetermined constant value, means responsive to the magnitude of the current in the output circuit of said amplifier to selectively render said reversible electrical motor operative for rotation in one direction or the other only when the magnitude of the current in the output circuit of said amplifier and thereby the total illumination of said light sensitive device is above or below said predetermined value, and means for measuring the value of said resistance.

15. Means for measuring the illumination from a source of light including an electric lamp constituting a second source of light, means for supplying energizing current to said lamp, a light sensitive device, stationary means for subjecting said light sensitive device simultaneously to light from said first mentioned source and from said second mentioned source, means to vary said lamp energizing means to maintain the total illumination of said light sensitive device at a predetermined constant value, and means associated with said light sensitive device to render said last mentioned means operative only when the total illumination of said light sensitive device is above or below said predetermined value.

16. Means for measuring the illumination from a source of light including an electric lamp constituting a second source of light, means for supplying energizing current to said lamp, a light sensitive device, stationary means for subjecting said light sensitive device simultaneously to light from said first mentioned source and said second mentioned source, means to control said lamp energizing means to maintain the total illumination of said light sensitive device at a predetermined constant value, means associated with said light sensitive device to render said last mentioned means operative only when the total illumination of said light sensitive device is above or below said predetermined value, and means for measuring said lamp energizing current.

17. Apparatus for measuring the illumination from a source of light including the combination of a light sensitive device and an electronic amplifier having an input circuit and an output circuit, a second source of light, stationary means for subjecting said light sensitive device simultaneously to light from said first mentioned source and from said second mentioned source, means including said light sensitive device associated with the input circuit of said amplifier operative upon a change in the illumination of said first mentioned source to vary the current in the output circuit of said amplifier, means to vary the illumination of said second mentioned source to maintain the total illumination of said light sensitive device at a predetermined constant value, and means responsive to the magnitude of the output current of said amplifier to render said varying means operative only when the total illumination of said light sensitive device is above or below said predetermined value.

THOMAS R. HARRISON.